3,424,750
17-SPIROTETRAHYDROFURANYL AND 17-OXO-SPIROTETRAHYDROFURANYL DERIVATIVES OF THE ANDROSTANE SERIES AND THE PREPARATION THEREOF
John H. Fried, Palo Alto, Calif., assignor to Syntex Corporation, Panama, Panama, a corporation of Panama
No Drawing. Filed Apr. 28, 1966, Ser. No. 545,850
U.S. Cl. 260—239.55       16 Claims
Int. Cl. C07c 173/00, 169/22, 169/50

ABSTRACT OF THE DISCLOSURE

Novel 17α, 23-oxido-21, 24-bisnorcholanes and 17α, 23-oxido-20-keto-21, 24-bisnorcholanes prepared by converting a 17-keto steroid to the corresponding 17α-cyclopropyl-17β-hydroxy compound which is treated with hydrogen halide to the 17-(γ-halo-n-propylidene) derivative, 17α-hydroxy-17β-(α-hydroxy-γ-halo-n-propyl)steroid followed by treatment with base to give a 17α, 23-oxido-20-hydroxy-21, 24-bisnorcholane which is oxidized to the corresponding 17α, 23-oxido-20-keto-21, 24-bisnorcholane. The compounds of the invention are useful as progestational agents.

---

This invention relates to novel processes for the preparation of steroids and to certain steroids thus produced.

More particularly, this invention pertains to the preparation of various spiro derivatives of the androstane and 19-nor androstane steroids. It is specifically directed at the 17-spirotetrahydrofuranyl steroids and the 17-oxospirotetrahydrofuranyl derivatives thereof, alternatively referred to as 17α,3-oxido-21,24-bisnorcholanes and 17α,23-oxido-20-keto-21, 24-bisnorcholanes. These compounds may be represented by the following partial formula:

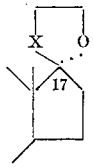

wherein X is methylene or carbonyl.

The novel processes of the present invention may be illustrated by the following overall transformations depicting the D ring of the steroid nucleus:

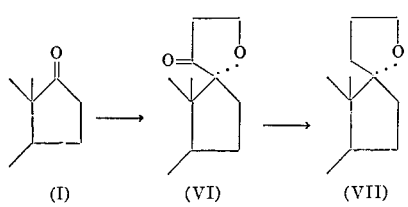

The above transformations may be further defined by the following reaction scheme in which again only the D ring of the steroid nucleus is shown:

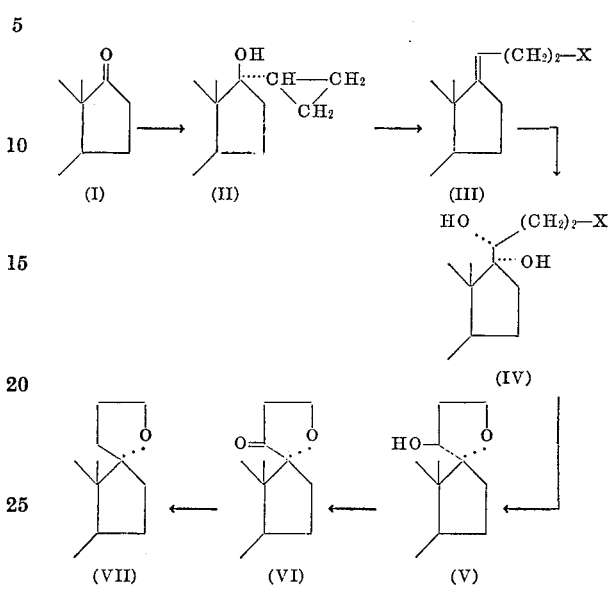

wherein X is halogen, preferably chloro.

Referring to the above scheme, the compounds represented by Formula II are prepared such as by treatment of Compounds I with first, acetylene in the presence of potassium metal in organic solution to give the corresponding 17α-ethynyl-17β-hydroxy, second, controlled hydrogenation of the thus prepared compound to the corresponding 17α-vinyl steroid, and, third, treatment thereof with an iodomethyl metal iodide such as is provided by a combination of methylene iodide and a metal couple, for example, zinc-copper, zinc-silver, chromium-copper, and the like in a suitable non-aqueous solvent medium. The compounds containing the 17α-cyclopropyl group (II) are then treated with hydrogen halide, notably hydrochloric acid, in organic solvent such as organic, aromatic and aliphatic hydrocarbons, ethers, and ketones, notably acetone, preferably at room temperature to afford the 17-(γ-halo-n-propylidene) derivatives represented by Formula III. Hydroxylation thereof with osmium tetroxide in dry benzene or other suitable anhydrous organic solvent such as toluene, xylene, ether, pyridine, and the like at temperatures from about 0°C. to about room temperature or higher yields the 17α,20-dihydroxy Compounds IV.

Ring closure of Compounds IV is effected with base treatment such as is provided by sodium hydride, potassium hydride, alkali metal alkoxides such as potassium t-butoxide, and the like in organic solvent such as organic aromatic hydrocarbons, notably benzene, aliphatic hydrocarbons, ethers, ketones, and the like, preferably at reflux temperatures thus giving the compounds illustrated by Formula V above. Oxidation of the ring hydroxyl group such as with chromic acid in acetone provides Compounds VI which comprises one group of novel steroids prepared in accordance with this invention.

Thereafter, the oxo function provided from the oxidation procedure described above is removed upon reduction under, for example, Wolff-Kishner conditions, thus providing the novel group as illustrated by Compound VII which comprises another novel group of compounds prepared via the novel processes of this invention.

The starting steroids (I) which may be utilized for practicing the novel processes of this invention as disclosed hereinbefore, belong to the androstane and 19-norandrostane series. Particularly important steroids thereof are the 6-halo-$\Delta^{4,6}$ derivatives, containing, in addition, certain other substituents, notably in ring A, as will be more completely described and illustrated hereinafter.

When practicing the above novel processes on the preferred starting steroids of this invention, there are produced therefrom the following 17-spiro derivatives represented by the following formula:

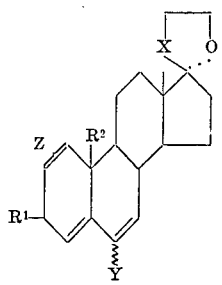

wherein $R^1$ is an oxygen atom or the group

in which $R^3$ is hydrogen, tetrahydrofuran-2-yl, tetrahydropyran-2-yl, or a hydrocarbon carboxylic acyl group of less than 12 carbon atoms such as acetate, propionate, enanthate, benzoate, adamantoate, and the like; $R^2$ is hydrogen or methyl; X is methylene or carbonyl; Y is chloro or fluoro; and Z is a carbon-carbon single bond, a carbon-carbon double bond, or the group

attached to carbons 1 and 2, Z being a carbon-carbon single bond when $R^2$ is hydrogen. Of particular importance are those compounds represented above in which $R^1$ is an oxygen atom.

The above compounds demonstrate hormonal properties characteristic of progestational agents and are thus useful in the regulation and control of fertility and in the management of various menstrual disorders. They may be administered via usual routes in the standard pharmaceutical compositions and at dosages appropriate for the particular condition being treated.

In the preparation of the above compounds, preferred starting steroids are the 6-haloandrosta-4,6-diene - 3,7 - diones and the 6-halo-19-norandrosta-4,6-diene-3,17-diones, notably the 6-chloro and -fluoro compounds. Corresponding starting steroids containing a 17β-hydroxyl may be initially oxidized to the 17-keto compounds via conventional procedures. The carbon-carbon double bond and/or the methylene group at C-1,2 is preferably introduced before C-17 elaboration according to the novel processes hereof is conducted. Thus, the $\Delta^1$-unsaturation may be introduced into the $\Delta^{4,6}$-dienes upon treatment with chloranil in n-amyl alcohol. Thereafter, the fused methylene group may be introduced, if desired, by reaction of the $\Delta^{1,4,6}$-unsaturated compound with diazomethane preferably at room temperature followed by vacuum pyrolysis to give the 1,2-methylene-$\Delta^{4,6}$-derivative. The orientation of the fused methylene group with respect to the carbons to which they are fused is generally alpha. In the reaction by which this group is introduced, some beta-isomer may be initially obtained and this may be readily separated, if desired, such as by chromatography.

The 6-halo groups, as mentioned above, are preferably present in the starting steroids although they may be introduced at a later stage by methods known in the art such as by converting 3-keto-$\Delta^4$-androstane to its enol ether upon treatment with ethylorthoformate followed by reaction thereof with n-chlorosuccinimide or perchloryl fluoride yielding the 6-chloro- or 6-fluoro-3-keto-$\Delta^4$-ene. The $\Delta^{4,6}$ system may be introduced therein upon treatment with chloranil in the presence of ethyl acetate and acetic acid.

After the principal reaction hereof by which the C-17 elaboration is conducted, the C-3 position may be substituted as represented by $R^1$ in the above formula. Thus, the 3-keto may be reduced such as with sodium borohydride in isopropanol and the resultant 3β-hydroxyl group may be etherified to the 3β-tetrahydrofuran-2-yloxy and the 3β-tetrahydropyran-2-yloxy ethers via reaction with dihydrofuran and dihydropyran, respectively, in the presence of p-toluenesulfonic acid. Alternatively, the secondary 3β-hydroxyl may be treated with an esterification agent such as acetic anhydride, propionic anhydride, and the like in the presence of pyridine to give the corresponding 3β-esters.

The following examples further illustrate the manner by which this invention may be practiced, but they are not to be construed as limitative upon the scope hereof.

Example 1

A solution of 1 g. of 6-chloroandrosta-4,6-diene-3,17-dione in 30 ml. of anhydrous benzene is added under nitrogen to a solution of 1.4 g. of potassium in 30 ml. of t-amyl alcohol previously saturated with acetylene. A slow current of purified acetylene is continually passed through the solution for 40 hours. The mixture is diluted with water and extracted with benzene. These extracts are washed with water to neutrality, dried over sodium sulfate and evaporated. Chromatography of the residue on alkaline alumina with 2:3 hexane:benzene yields 6-chloro-17α-ethynylandrosta-4,6-diene-17β-ol-3-one which is recrystallized from acetone:hexane.

A solution of 1 g. of 6-chloro-17α-ethynylandrosta-4,6-diene-17β-ol-3-one in 40 ml. of pyridine is hydrogenated at 25° C. atmospheric pressure in the presence of 0.4 g. of Lindlar catalyst. When 1.1 molar equivalents of hydrogen are absorbed, the reaction is stopped. The catalyst is removed by filtration through Celite diatomaceous earth and washed with ethyl acetate and the combined filtrate and washings are evaporated to dryness under reduced pressure. The residue is dissolved in ethyl acetate and this solution then washed with dilute hydrochloric acid and water to neutrality, dried and evaporated to dryness to yield 6-chloro-17α-vinylandrosta-4,6-diene-17β-ol-3 - one which is further purified through recrystallization from acetone.

A mixture of 7 g. of methylene iodide and 3 g. of zinc-copper couple in 15 ml. of anhydrous ether is heated at reflux under nitrogen for 3 hours. The mixture is then cooled and 2 g. of 6-chloro-17α-vinylandrosta-4,6-diene-17β-ol-3-one are added. This mixture is allowed to stand at room temperature for 2 hours and is then poured into 200 ml. of 2% aqueous sodium carbonate and extracted twice with 100 ml. portions of ether. These extracts are dried over sodium sulfate and evaporated under reduced pressure. The residue is held at 0.01 mm. to remove any unreacted methylene iodide and then recrystallized from hexane to yield 6-chloro-17α-cyclopropylandrosta-4,6-diene-17β-ol-3-one.

A solution of 500 mg. of 6-chloro-17α-cyclopropylandrosta-4,6-diene-17β-ol-3-one in 20 ml. of acetone containing 5 ml. of 2 N hydrochloric acid is allowed to stand at room temperature for 30 minutes. The solution is then diluted with water, extracted with ether, dried and evaporated to an oil. Chromatography of this oil, utilizing benzene-ether as eluant, yields 6,23-dichloro-21,24-bisnorchola-4,6,17-trien-3-one.

To a solution of 730 mg. of 6,23-dichloro-21,23-bisnorchola-4,6,17-trien-3-one in 7 ml. of dry benzene is added 500 mg. osmium tetroxide and the reaction mixture is allowed to stand at 0°C. overnight and thereafter at room temperature for two additional hours and then the mixture is carefully evaporated. The residue is dissolved in 30 ml. pyridine and with stirring 10 ml. of sodium sulfite (10%) and 8 ml. of 2 N hydrochloric acid are added. After 30 minutes, the resultant solution is poured into 50 ml. of water, extracted with three 30 ml. portions of chloroform, washed with water and evaporated. The residue is dissolved in chloroform and the resultant solution is chromatographed on deactivated alumina, eluting with chloroform. Crystallization gives 6,23-dichloro-21,24-bisnorchola-4,6-diene-17α,20-diol-3-one which may be further purified upon recrystallization from benzene-petroleum ether.

A solution of 6,23-dichloro-21,24-bisnorchola-4,6-diene-17α,20-diol-3-one (300 mg.) in 15 ml. of benzene containing 1 g. of sodium hydride is refluxed for 90 minutes. An additional 0.5 g. of sodium hydride is added and refluxing continued for an additional hour. The benzene solution is removed by decantation, washed with water and evaporated to give 6-chloro-17α,23-oxido-21,24-bisnorchola-4,6-dien-20-ol-3-one which may be further purified upon recrystallization from benzene-petroleum ether.

To a stirred solution of 1 g. of 6-chloro-17α,23-oxido-21,24-bisnorchola-4,6-dien-20-ol-3-one in 10 ml. of acetone, cooled to 0°C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5°C. and diluted with water. The solid which forms is collected by filtration, washed with water and dried under vacuum to yield 6-chloro-17α,23-oxido-21,24-bisnorchola-4,6-diene-3,20-dione which may be further purified by recrystallization from acetone:hexane.

Similarly, 6-fluoro-17α,23-oxido-21,24-bisnorchola-4,6-diene-3,20-dione is prepared as above from 6-fluoroandrosta-4,6-diene-3,17-dione. Also thus prepared are the corresponding 19-nor derivatives from the 6-halo-19-norandrosta-4,6-diene-3,17-diones.

Example 2

By following the procedures outlined in Example 1 hereof, 6-chloro-17α,23-oxido-21,24-bisnorchola-1,4,6-triene-3,20-dione is prepared from 6-chloroandrosta-1,4,6-triene-3,17-dione. This latter compound is provided from 6-chloroandrosta-4,6-diene-3,17-dione via the following procedure.

A mixture of 1 g. of 6-chloroandrosta-4,6-diene-3,17-dione, 2 g. of chloranil and 10 ml. of n-amyl alcohol are refluxed under nitrogen for 24 hours. The mixture is then cooled, washed with a cold aqueous solution of 10% sodium hydroxide until the washings are colorless, dried over sodium sulfate and evaporated. Chromatography of the residue on neutral alumina yields 6-chloroandrosta-1,4,6-triene-3,17-dione which may be further purified through recrystallization from acetone:hexane.

Similarly, 6-fluoroandrosta-1,4,6-triene-3,17-dione is prepared from 6-fluoroandrosta-4,6-diene-3,17-dione.

Example 3

By following the procedures set forth in Example 1 above, 1,2-methylene-6-chloro-17α,23-oxido-21,24-bisnorchola-4,6-diene-3,20-dione is prepared from 1,2methylene-6-chloroandrosta-4,6-diene-3,17-dione.

The requisite starting steroid for the above procedure hereof is provided as follows:

A solution of 17.2 cc. of potassium hydroxide (40%) and 5.7 g. of nitrosomethyl urea in 100 ml. of ether is reacted at −5°C. To the ethereal phase is added 1 g. of 6-chloroandrosta-1,4,6-triene-3,17-dione and the solution is allowed to stand at room temperature for 6 days. Thereafter, the solution is filtered and the filtrate evaporated at room temperature under vacuum to remove the ether. Chromatography on silica gel yields the corresponding 1,2-pyrazoline compound. The compound thus obtained is heated under high vacuum at a temperature of 140°C. After 10 minutes the pyrolysis is complete, giving 1,2-methylene-6-chloroandrosta-4,6-diene-3,17-dione which can be purified by crystallization from cyclo-hexane-ethyl acetate.

Similarly, 1,2-methylene-6-fluoro-17α,23-oxido-21,24-bisnorchola-4,6-diene-3,20-dione is prepared from 6-fluoroandrosta-1,4,6-triene-3,17dione.

Example 4

A mixture of 1 g. of 6-chloro-17α,23-oxido-21,24-bisnorchola-4,6-diene-3,20-dione, 2 g. of hydrazine hydrate, 1.2 g. of potassium hydroxide, 1.2 ml. of water and 1.2 ml. of diethylene glycol is heated for 45 minutes at reflux, then in an open flask until the temperature of the reaction mixture is 200°C., and finally for an additional 2 hours at reflux. The mixture is cooled, water added and the product isolated by extraction with ether. These extracts are dried over sodium sulfate and evaporated to yield 6-chloro-17α,23-oxido-21,24-bisnorchola-4,6-diene-3-one which may be further purified through recrystallization from acetone:hexane.

Similarly, the following 20-desoxy compounds are prepared from the corresponding requisite starting compounds respectively prepared via the procedures of Examples 1, 2, and 3.

6-fluoro-17α,23-oxido-21,24-bisnorchola-4,6-dien-3-one,
6-chloro-17α,23-oxido-21,24-bisnorchola-1,4,6-trien-3-one,
6-fluoro-17α,23-oxido-21,24-bisnorchola-1,4,6-trien-3-one,
1,2-methylene-6-chloro-17α,23-oxido-21,24-bisnorchola-4,6-dien-3-one,
1,2-methylene-6-fluoro-17α,23-oxido-21,24-bisnorchola-4,6-dien-3-one,
6-chloro-17α,23-oxido-19,21,24-trisnorchola-4,6-dien-3-one, and
6-fluoro-17α,23-oxido-19,21,24-trisnorchola-4,6-dien-3-one.

Example 5

The 6-chloro and 6-fluoro groups may be introduced and the Δ$^{4,6}$-diene system may be provided in the starting steroids as follows.

To a suspension of 1 g. of androst-4-ene-3,17-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxyandrosta-3,5(6)-diene-17-one, which is recrystallized from acetone:hexane.

A mixture of 5 g. of 3-ethoxyandrosta-3,5(6)-diene-17-one, 2 g. of anhydrous sodium acetate and 100 ml. of acetone is treated with 32 ml. of water. The solution is cooled to 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloroandrost-4-ene-3,17-dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water and dried to yield 6α-chloroandrost-4-ene-3,17-dione which is recrystallized from acetone: hexane.

A stream of perchloryl fluoride is passed through a solution of 1 g. of 3-ethoxyandrosta-3,5(6)-diene-17-one in 25 ml. of dimethylformamide, cooled to 0° C. for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 6α-fluoroandrost-4-ene-3,17-dione which is recrystallized from acetone:hexane.

A mixture of 1 g. of 6-chloroandrost-4-ene-3,17-dione, 2 g. of chloranil, 15 ml. of ethyl acetate and 5 ml. of acetic acid is refluxed under nitrogen for 96 hours. The mixture is then cooled and washed with cold 10% aqueous sodium hydroxide until the washings are colorless. The organic solution is dried over sodium sulfate and the ethyl acetate removed by evaporation. Upon chromatography of the residue on neutral alumina there is obtained 6-chloroandrosta-4,6-diene-3,17-dione which may be further purified by recrystallization from acetone:hexane.

Similarly, 6-fluoroandrosta-4,6-diene-3,17-dione is prepared from 6-fluoroandrost-4-ene-3,17-dione.

Example 6

The cyclopropyl ring opening procedure with hydrochloric acid described in paragraph 4 of Example 1 is repeated using hydrobromic acid in benzene at room temperature for 1 hour, thus giving 6-chloro-23-bromo-21,24-bisnorchola-4,6,17-trien-3-one.

Example 7

The oxidation procedure with osmium tetroxide set forth in paragraph 5 of Example 1 is repeated using ether as solvent and pyridine as solvent in lieu of benzene with similar results in each case.

Example 8

After the principal reaction hereof has taken place as described above, the C–3 position may be further modified as follows using representative compounds.

A solution of 200 mg. of 6-chloro-17α,23-oxido-21,24-bisnorchola-4,6-diene-3,20-dione in 32 ml. of anhydrous isopropanol and 25 mg. of sodium borohydride is stirred at room temperature for 15 hours. One-hundred milliliters of water is added and the resulting suspension extracted several times with ether. The ether phase is dried over sodium sulfate and evaporated to dryness under reduced pressure to yield 6-chloro-17α,23-oxido-21,24-bisnorchola-4,6-dien-3β-ol-20-one which may be further purified by recrystallization from ether.

Two milliliters of dihydrofuran are added to a solution of 1 g. of 6-chloro-17α,23-oxido-21,24-bisnorchola-4,6-dien-3β-ol-20-one in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β-tetrahydrofuran-2-yloxy-6-chloro-17α,23-oxido-21,24 - bisnorchola-4,6-dien-20-one which is recrystallized from pentane.

Similarly, by repeating the above procedure with dihydropyran, 3β-tetrahydropyran - 2-yloxy-6-chloro-17α,23-oxido-21,24-bisnorchola-4,6-dien-20-one is prepared.

The 3β-ester groups may be provided according to the following typical procedures.

A mixture of 1 g. of 6-chloro-17α,23-oxido-21,24-bisnorchola-4,6-dien-3β-ol-20-one, 4 ml. of pyridine, and 2 ml. of acetic anhydride is allowed to stand at room temperature for 15 hours. The mixture is then poured into ice water and the solid which forms is collected by filtration, washed with water and dried to yield 3β-acetoxy-6-chloro-17α,23-oxido - 21,24 - bisnorchola-4,6-dien-20-one which may be further purified through recrystallization from acetone:hexane.

Similarly, by substituting propionic anhydride in the above procedure the corresponding 3β-propionoxy ester is prepared.

A mixture of 2 g. of 6-chloro-17α,23-oxido-21,24-bisnorchola-4,6-dien-3β-ol-20-one in 8 ml. of pyridine and 4 ml. of adamantoyl chloride is heated at steam bath temperatures for one hour. The mixture is then poured into ice water and the solid which forms is collected by filtration, washed with water and dried to yield 3β-adamantoyloxy-6-chloro - 17α,23 - oxido-21,24-bisnorchola-4,6-dien-20-one which is further purified through recrystallization from ethylene chloride:hexane.

The procedures outlined above in this example may also be used to prepare the corresponding 3β-hydroxy, -tetrahydrofuran-2-yloxy, -tetrahydropyran - 2 - yloxy, -acetoxy, -propionoxy, and -adamantoyloxy compounds as well as other 3β-ester compounds of the various starting steroids prepared by the procedure of Examples 1, 2, 3, and 4.

Example 9

Alternatively, the following procedures may be used to prepare the compounds of this invention.

A solution of 50 mg. of 6-chloro-17α-cyclopropylandrosta-4,6-dien-17β-ol-3-one in 100 mg. of anhydrous sodium acetate and 1 ml. of glacial acetic acid is allowed to stand at room temperature for several minutes. The mixture is then refluxed for 45 minutes and diluted with water. The diluted reaction mixture is extracted with ethyl ether, evaporated and crystallized from ethyl ether-petroleum ether to give 6-chloro-23-acetoxy-21,24-bisnorchola-4,6,17-trien-3-one.

The product thus obtained is refluxed with 500 ml. of potassium hydroxide in methylene solution under a nitrogen atmosphere for 1 hour. Thereafter, the reaction mixture is extracted with ethyl ether and evaporated to yield 6-chloro-21,24-bisnorchola-4,6,17-trien-23-ol-3-one.

A mixture of 5 g. of 6-chloro-21,24-bisnorchola-4,6,17-trien-23-ol-3-one in 100 ml. of dioxane is cooled to 5° C. and 1.1 molar equivalents of N-bromosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water, and dried under vacuo to yield 6-chloro-17,23-oxido-23-bromo-21,24-bisnorchola-4,6-dien-3-one which is further purified upon recrystallization from acetone.

Twenty grams of standard Raney nickel catalyst is refluxed with stirring for 2 hours in 60 ml. of acetone. A solution of 2 g. of 6-chloro-17,23-oxido-23-bromo-21,24- bisnorchola-4,6-dien-3-one in 40 ml. of acetone and 40 ml. of water is added and the refluxing is continued for an additional hour. The reaction mixture is filtered and the filtrate is concentrated in vacuo and extracted with ether. The ethereal layer is successively washed with 100 ml. of cold sodium hydride (1%), 100 ml. of 1 N hydrochloric acid, and finally 300 ml. of water, dried over sodium sulfate and evaporated to dryness to give 6-chloro-17,23-oxido-21,24-bisnorchola-4,6-dien-3-one.

Example 10

A solution of 50 mg. of 6-chloro-21,24-bisnorchola-4,6,17-trien-23-ol-3-one in 5 ml. of pyridine is warmed to about 50° C. with 500 mg. of p-toluenesulfonyl chloride. Water is thereafter added and the resultant mixture is extracted with ethyl ether and evaporated to yield 6,23-dichloro-21,24-bisnorchola-4,6,17-trien-3-one.

6,23-dichloro-21,24-bisnorchola - 4,6 - diene-17α,20-diol-3-one is prepared from 6,23-dichloro-21,24-bisnorchola-4,6,17-trien-3-one via the procedure outlined in paragraph 5 of Example 1 utilizing osmium tetroxide reagent. Thereafter, by following the ring closure procedures and the oxidation of the ring hydroxy group to the 20-keto group also described in Example 1, 6-chloro-17α,23-oxido-21,24-bisnorchola-4,6-diene-3,20-dione is prepared, which may be reduced as described in Example 4, thus giving 6-chloro-17α,23-oxido-21,24-bisnorchola-4,6-dien 3-one.

Similarly, the other compounds prepared in accordance with the procedures set forth in Examples 1, 2, and 3 above, may be prepared via the procedure described herein.

What is claimed is:

1. A process which comprises reacting a 17-keto steroid of the androstane or 19-norandrostane series with acetylene in the presence of potassium and t-amyl alcohol in benzene to give the corresponding 17α-ethynyl-17β-hydroxy steroid, subjecting said 17α-ethynyl-17β-hydroxy steroid to catalytic hydrogenation to obtain the corresponding 17α-vinyl-17β-hydroxy steroid which is treated with an iodomethyl metal iodide, said metal being selected from the group consisting of zinc-copper, zinc-silver and chromium-copper, in a non-aqueous solvent to give the corresponding 17α - cyclopropyl-17β-hydroxy compound, treating the cyclopropyl compound with hydrochloric acid or hydrobromic acid in organic solution to give the 17-(γ-halo-n-propylidene) derivative, hydroxylating the 17-(γ-halo-n-propylidene) derivative with osmium tetroxide in an anhydrous organic solvent to give the 17α-hydroxy-17β-(α-hydroxy-γ-halo-n-propyl) steroid, treating this steroid with a base selected from the group consisting of alkali metal hydrides and alkali metal alkoxides in an organic solvent to provide the 17α,23-oxido-20-hydroxy-21,24-bisnorcholane compound, and oxidizing this compound to the corresponding 17α,23-oxido-20-keto-21,24-bisnorcholane steroid by treatment with chromic acid in acetone.

2. The process of claim 1 wherein a 6-chloroandrosta-4,6-diene-2,17-dione is converted to a 6-chloro-17α,23-oxido-21,24-bisnorchola-4,6-diene-3,20-dione.

3. The process of claim 1 including the step of reducing the 17α,23-oxido-20-keto-21,24-bisnorcholane steroid by heating with hydrazine hydrate and potassium hydroxide in aqueous diethylene glycol to the corresponding 17α,23-oxido-21,24-bisnorcholane steroid.

4. The process of claim 3 wherein a 6-chloroandrosta-4,6-diene-3,17-dione is converted to a 6-chloro-17α,23-oxido-21,24-bisnorchola-4,6-dien-3-one.

5. Steroids of the formula:

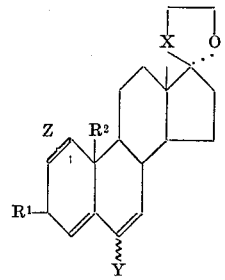

wherein R¹ is an oxygen atom or the group

in which R³ is hydrogen, tetrahydrofuran-2-yl, tetrahydropyran-2-yl, or a hydrocarbon carboxylic acyl group of less than 12 carbon atoms; R² is hydrogen or methyl; X is methylene or carbonyl; Y is chloro or fluoro; and Z is a carbon-carbon single bond, a carbon-carbon double bond, or the group

attached to carbons 1 and 2, Z being a carbon-carbon single bind when R² is hydrogen.

6. Steroids of claim 5 wherein R¹ is an oxygen atom and each of R², X, Y, and Z is as therein defined.

7. Steroids of claim 6 wherein X is carbonyl and Y is chloro.

8. A steroid of claim 7 wherein R² is hydrogen and Z is a carbon-carbon single bond.

9. A steroid of claim 7 wherein R² is methyl and Z is a carbon-carbon single bond.

10. A steroid of claim 7 wherein R² is methyl and Z is a carbon-carbon double bond.

11. A steroid of claim 7 wherein R² is methyl and Z is the group

12. Steriods of claim 6 wherein X is methylene and Y is chloro.

13. A steroid of claim 12 wherein R² is hydrogen and Z is a carbon-carbon single bond.

14. A steroid of claim 12 wherein R² is methyl and Z is a carbon-carbon single bond.

15. A steroid of claim 12 wherein R² is methyl and Z is a carbon-carbon double bond.

16. A steroid of claim 12 wherein R² is methyl and Z is the group

References Cited

UNITED STATES PATENTS 3,254,074   5/1966   Arth et al. _____ 260—239.55

LEWIS GOTTS, *Primary Examiner.*

ETHEL G. LOVE, *Assistant Examiner.*

U.S. Cl. X.R.

260—397.3, 397.4, 999